United States Patent Office 3,313,416
Patented Apr. 11, 1967

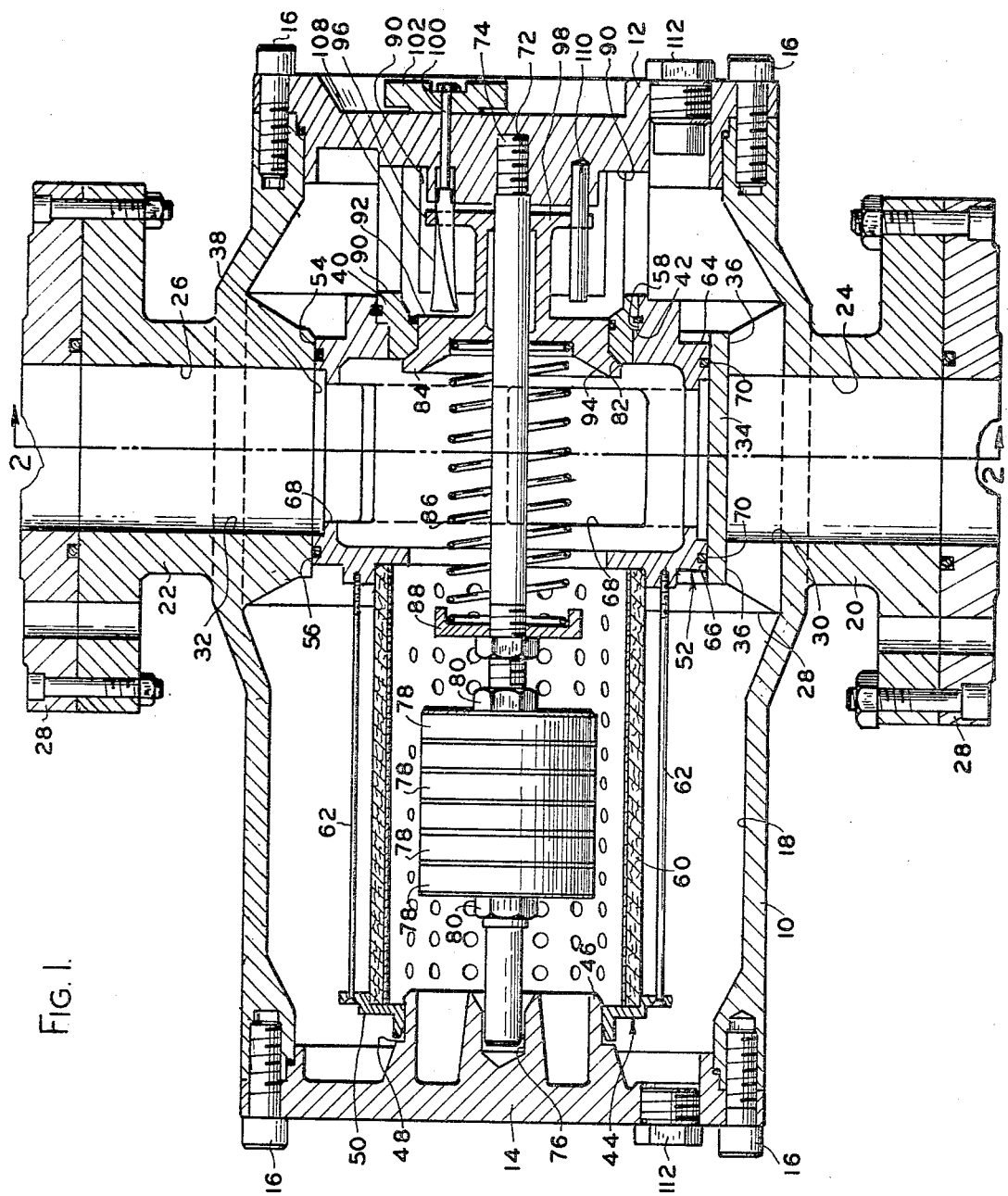

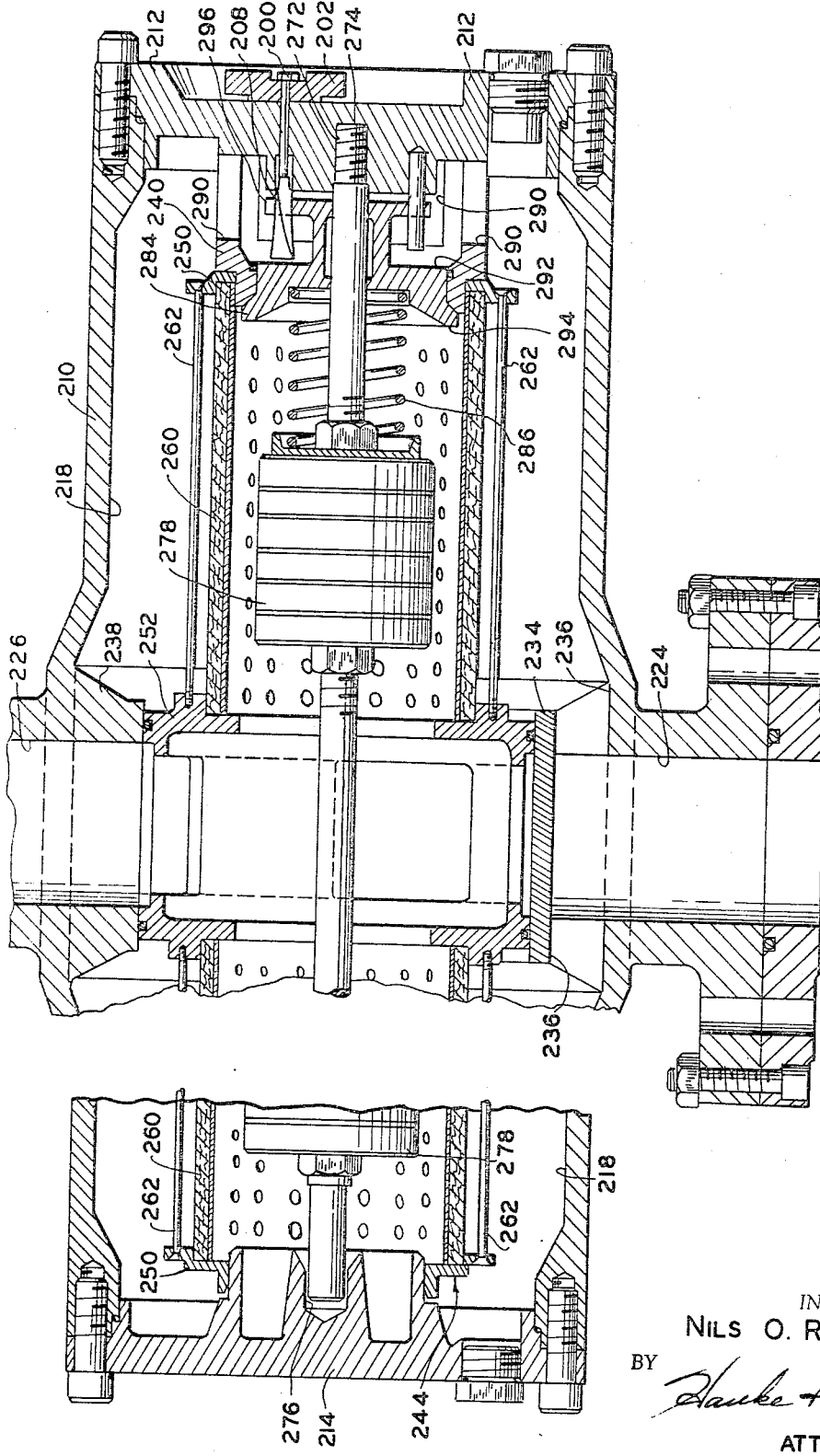

3,313,416
BAFFLED FILTER DEVICE
Nils O. Rosaen, Bloomfield Hills, Mich., assignor to The Rosaen Filter Company, Hazel Park, Mich., a corporation of Michigan
Filed Oct. 9, 1963, Ser. No. 314,919
11 Claims. (Cl. 210—90)

The present invention relates to fluid systems particularly to a filter device for such systems and more particularly to such a device adapted for use in high pressure, high capacity systems and including baffle means for protecting the filter element from damage caused by fluid entering the device at high velocity.

It is common in the art to provide fluid systems with a filtering device utilizing replaceable and disposable filter elements for removing impurities from the fluid during operation of the system. For reasons of economy it is desirable to construct such filter elements of a light weight and inexpensive material such as porous paper, fibrous material or the like. It has been found, however, that when such filter elements are utilized in high pressure, high capacity systems the foreign particles entrained in the incoming fluid have such a high velocity that they tend to pierce and damage such filter elements and thus the life of such elements is substantially reduced.

My copending application Ser. No. 311,164, filed September 24, 1963 now Patent No. 3,291,307 and entitled "Removable Tubular Filter and Baffle Construction" discloses and claims a new filter device adapted for use in high pressure, high capacity systems. An important feature of the filter device of my copending application is a baffle member positioned within the filter housing and within the path of incoming fluid to protect the filter element from damage. Although this filter device has for the most part proven satisfactory, the device of the present invention offers substantial advantages over the construction of my heretofore disclosed device.

The device of the present invention provides a baffle means which is formed as an integral part of the filter housing. The filter element or elements are secured to a porting member to form a filter assembly which may be readily removed for cleaning or replacing of the element or elements. The guide surface for the filter assembly which must be machined to provide a substantially true cylindrical or annular surface to prevent wedging of the assembly upon removal or installation has been substantially reduced in length from that of my heretofore disclosed device. In one embodiment of the device of my copending application an outlet bore was provided in the baffle member in alignment with an outlet provided in the filter housing. Such a construction has been found to unnecessarily increase the difficulty of removing and replacing the filter assembly since care must be taken to align the outlet bore with the outlet or leakage past the filter element will result. Means provided in the device to insure proper alignment add to the expense of manufacturing the device.

It is an object then of the present invention to provide filter elements for high pressure high capacity fluid systems and baffle means for such systems positioned to protect the filter element from the force of incoming fluid.

It is another object of the present invention to provide filter devices and baffle means as an integral part of the filter housing.

It is still another object of the present invention to facilitate the replacement of filter elements for baffled filter devices by providing a self-aligning assembly for such a device.

It is yet another object of the present invention to provide a new filter device incorporating a substantially reduced guide surface for the filter assembly and a porting member insuring flow through the filter element and to the outlet without necessitating a radial alignment of the porting member with the outlet.

Still further objects and advantages of the present invention will readily occur to one skilled in the art to which the present invention pertains upon reference to the following drawings in which like reference characters refer to like parts throughout the several views and in which FIG. 1 is a longitudinal cross sectional view of one preferred filter device of the present invention.

FIG. 5 is a view similar to FIG. 4 but illustrating another preferred embodiment of the present invention.

Description

Figure 4:
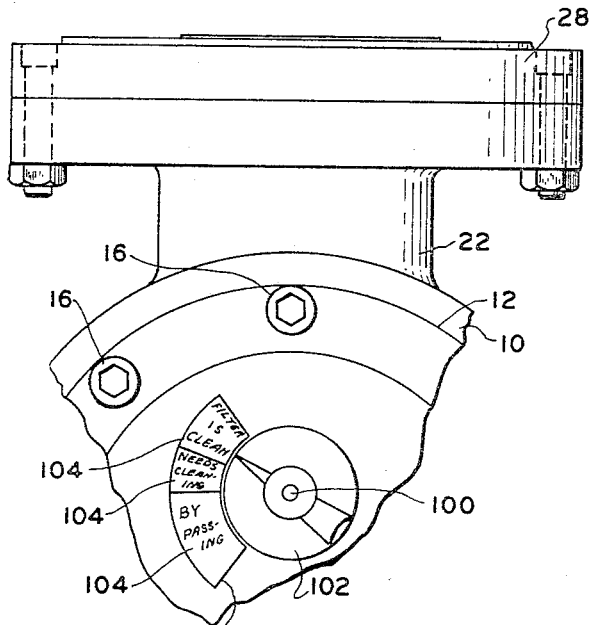
FIG. 4 is a fragmentary end elevational view of the device as seen from the right hand side of FIG. 1.

Now referring to the drawings for a more detailed description of the present invention, FIGS. 1-4 illustrate a preferred filter device as comprising a substantially tubular housing 10. End caps 12 and 14 are removably secured to the housing 10 by bolts 16. The housing 10 and the end caps 12 and 14 define a substantially cylindrical chamber 18. Intermediate the ends of the housing 10 radially outwardly extending boss sections 20 and 22 are provided. The boss portions 20 and 22 are provided with circular radially extending through bores which define an inlet 24 and an outlet 26 respectively. Fittings 28 which are adapted to carry suitable conduits (not shown) are bolted to the housing 10 in alignment with the inlet 24 and the outlet 26 as shown.

The inner annular surface of the housing 10 is provided with a radially inwardly enlarged portion 28. The enlarged portion 28 is provided with a radially extending inlet passage 30 in axial alignment with the inlet 24 and a radially extending outlet passage 32 in axial alignment with the outlet 26. The enlarged portion 28 is formed to provide a baffle member 34 which is positioned across the inlet passage 30 to divert incoming fluid axially outwardly through an axially extending passage 36 also provided in the enlarged portion 28. The axially extending passage 36 provides communication between the inlet passage 30 and the chamber 18 on each side of the enlarged portion 28. The enlarged portion 28 forms an annular guide surface 38 substantially concentric to the longitudinal axis of the housing 10 and preferably radially inwardly spaced from the interior surface of the housing 10 as shown.

The end cap 12 is provided with an axially inwardly extending boss portion 40. The free end of the boss portion 40 is provided with an annular shoulder 42 which provides a seat for one end of a filter assembly 44 as will be described in greater detail below. The end cap 14 is provided with an axially extending boss portion 46. The boss portion 46 is provided with a radially outwardly extending flange portion 48 which provides the seat for the opposite end of the filter assembly 44.

The guide surface 38, the shoulder 42 and the flange 48 provide the means for positioning the filter assembly 44 within the chamber 18. The filter assembly preferably comprises a flanged member 50 which seats on the flange 48, a porting member 52 provided with axially spaced annular surfaces 54 and 56 which axially slidably engage the guide surface 38 and a flanged portion 58 seating on the shoulder 42. A substantially cylindrical filter element 60 is sandwiched between the flange member 50 and the porting member 52 by a plurality of screws 62.

Figure 3:
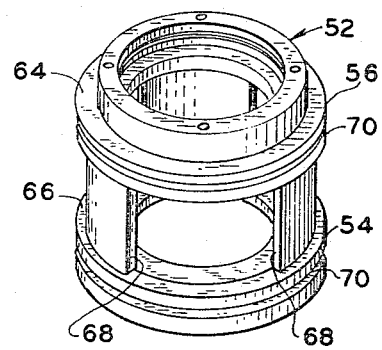
FIG. 3 is a perspective view of a preferred porting member of the present invention.
Figure 2:
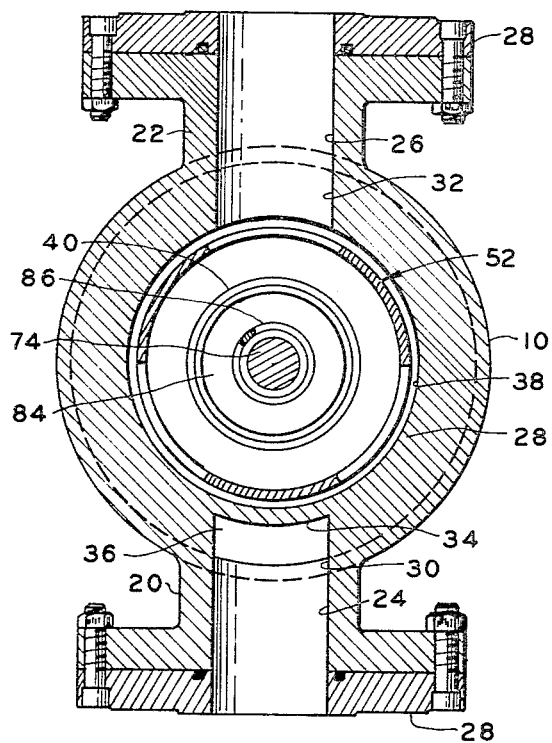
FIG. 2 is a cross sectional view taken substantially on the line 2—2 of FIG. 1.

The porting member 52 as can best be seen in FIG. 3 is preferably substantially cylindrical in shape. Axially spaced radially outwardly extending flanges 64 and 66 form the annular surfaces 54 and 56 respectively. The porting member 52 is preferably hollow as shown and a plurality of ports 68 are provided to open to the interior of the porting member 52. Piston seals 70 are carried by the flanges 64 and 66 to prevent fluid leakage between the surfaces 54 and 56 and the guide surface 38.

The end cap 12 is provided with an axially extending internally threaded bore 72 which receives the threaded end of a rod 74. The boss 40 is hollow as shown and is open at the free end thereof. The rod 74 extends axially through the open end of the boss portion 40, through the porting member 52, the filter element 60, and flanged member 50 to be received loosely by a bore 76 provided in the end cap 14. A plurality of magnets 78 are carried on the rod 74 by nuts 80. The magnets 78 are positioned interiorly of the filter element 60.

The open end of the boss portion 40 is formed to provide a valve seat 82 and a valve 84 is axially slideably carried on the rod 74 to be received by the valve seat 82. A spring member 86 biased between a spring seat 88 carried on the rod 74 and the valve 84 urges the valve 84 toward the seat 82 and a normally closed position. A plurality of ports 90 are provided in the boss portion 40 to provide communication between the inlet 24 and the surface 92 of the valve 84 opposite the spring member 86. The surface 94 of the valve member 84 opposite the surface 92 is subjected to the pressure of the fluid at the outlet 26.

The valve 84 is provided with a pair of slotted radially extending arms 96 and 98 as can best be seen in FIG. 1. The slot provided in the arm 96 is preferably rectangular in form. A shaft 100 is rotatably carried in the end cap 12 and as can best be seen in FIGS. 1 and 4 a pointer element 102 is secured to the end of the shaft 100 positioned exteriorly of the end cap 12. The pointer element 102 rotates with the shaft 100 and points to indicia 104 provided on an indicator plate 106. An actuator element 108 is carried on the interior end of the shaft 100 substantially coaxial therewith and extends through the slot provided in the arm 96. The actuator element 108 preferably comprises an elongated strip having a substantially uniform twist about its longitudinal axis from end to end. It is apparent then that axial movement of the valve 84 will cause the arm member 96 to move axially with respect to the actuator element 108 and will engage the sides of the actuator element 108 to produce a corresponding rotation of the shaft 100 and the pointer element 102.

A pin 110 is secured to the end cap 12 and is received by the slot provided in the arm 98 to provide a guide for the valve 84.

Drain plugs 112 are preferably provided in the end caps 12 and 14 as shown in FIG. 1.

In operation of the preferred filter device illustrated in FIGS 1–4, fluid entering the inlet 24 at high velocity will impinge upon the surface of the baffle member 34 and will be diverted through the passages 36 into the chamber 18. The fluid will then pass radially inwardly through the filter element 60 and axially through the filter element 60 through the porting member 52 to the outlet 26.

The baffle member 34 protects the filter element 60 from direct impingement by particles entrained in the high velocity entering fluid and because of this relatively lightweight and therefore inexpensive materials can be used for the element 60. The magnets 78 attract any metallic particles entrained in the fluid and which are small enough to pass through the filter element 60.

As the filter element 60 becomes clogged the pressure differential across the element 60 will increase and because the surfaces 92 and 94 of the valve member 84 are subjected to this pressure differential an increase sufficient to overcome the spring member 86 will cause the valve 84 to move axially on the rod 74 against the force of the spring member 86. Any axial movement of the valve 84 will be transmitted through the actuator element 108, the shaft 100 and the pointer element 102 so that the indicia 104 can be positioned to accurately indicate the position of the valve 84 and hence the condition of the filter element 60.

As the filter element 60 becomes clogged and before it has become so clogged as to create a danger of rupturing the valve 84 will have moved a sufficient axial length against the force of the spring member 86 to open a by-pass path directly from the inlet 24 through the passage 36 and the open valve 84 to the interior of the porting member 52 to the outlet 26.

To replace the filter element 60 the end cap 14 is unbolted and removed from the housing 10. The filter assembly 44 including the flanged member 50, the filter element 60 and the porting member 52 is axially removed from the housing 10.

After a new filter element 60 is secured in place between the flanged member 50 and the porting member 52, the filter assembly may again be slid into the housing 10. It is to be noted that the particular construction disclosed by providing the porting member 52 and the spaced flanges 64 and 66 does not require a particular radial positioning of the filter assembly with respect to the inlet 24 and outlet 26 of the housing 10 and thus it is not necessary to provide any means to insure such a particular position. Further for this reason a filter device has been provided in which a plurality of outlets may be provided with very little modification being necessary.

It is also apparent that by providing the porting member 52 as a part of the filter assembly and forming the housing 10 to provide the baffle member 34 and a relatively short axially extending guide surface 38 a substantial reduction in manufacturing cost has been achieved over the construction of my aforementioned patent. To insure that the filter assembly 44 will not become wedged as it is inserted or removed from the housing 10 it is only necessary to machine the guide surface 38 so that it is substantially concentric to the axis of the housing 10. In those devices heretofore disclosed by me, it was necessary to machine substantially the entire length of the interior surface of the housing 10.

Now referring to FIG. 5 another preferred filter device of the present invention is illustrated as comprising a substantially tubular housing 210 closed at each end by end caps 212 and 214 respectively. The housing 210 is provided with an inlet 224 and an outlet 226 and a chamber 218 substantially as described with respect to the embodiment described above. A radially inwardly enlarged portion 238 is provided in the housing 210 adjacent the inlet 224 and the outlet 226 and substantially midway between the ends of the housing 210. The enlarged portion 238 forms a baffle member 234 adjacent the inlet 224 to direct incoming fluid through axially extending passages 236 and into the chamber 218.

A filter assembly 244 is carried in the housing 210 and preferably comprises a porting member 252 substantially similar in construction to the porting member 52 described above. A pair of filter elements 260 are carried in a coaxial position by flanged members 250, screws 262 and the porting member 252.

The end cap 212 is provided with a hollow, axially inwardly extending boss portion 240. A threaded rod 274 is received by a threaded bore 272 provided in the end cap 212 and extends axially through the filter assembly 244 and is loosely received at its free end by a bore 276 provided in the end cap 214. The rod 274 preferably carries a plurality of magnets 278 positioned interiorly of each of the filter elements 262.

A valve 284 is axially slidably carried by the rod 274 and is urged by a spring member 286 toward a position closing the open end of the boss portion 240. Passages 290 provided in the boss portion 240 communicates with the inlet 224 so that one surface 292 of the valve member 284 is subjected to the pressure of the incoming fluid. An opposite surface 294 is subjected to the pressure on the outlet side of the filter elements 262.

The valve member 284 is provided with a radially extending slotted arm 296 which receives an actuator element 208. A shaft 200 and a pointer element 202 secured thereto are provided in the end cap 212 to provide indicating means which correspond to those described above.

It is clear that the preferred embodiment illustrated in FIG. 5 is substantially similar in operation to the operation of the embodiment illustrated in FIGS. 1–4. The only difference in construction between these two embodiments resides in the provision of two filter elements in the embodiment of FIG. 5 and the changes in the bypass valve means made necessary by the provision of two filter elements.

Although I have described two preferred embodiments of my present invention, it is apparent that other changes and modifications can be made without departure from the scope of the present invention as expressed by the appended claims.

I claim:
1. A filter device comprising
 (a) a housing defining a closed cavity and having an inlet and an outlet communicating with said cavity,
 (b) a filter assembly including a substantially cylindrical filter element carried in said cavity,
 (c) said filter element being radially inwardly spaced from the inner wall of said housing and being substantially coaxial therewith to form a substantially annular outer chamber exteriorly of said filter element and a generally cylindrical chamber interiorly of said filter element,
 (d) said housing having a radially inwardly enlarged portion intermediate the ends of said housing,
 (e) said filter assembly further comprising a hollow porting member axially slidably engaging the surface of said enlarged portion and being secured to one end of said filter element in substantially axial alignment therewith,
 (f) said enlarged portion being provided with said inlet, a baffle member adjacent said inlet and a passage adjacent said baffle member providing communication with said annular chamber,
 (g) said outlet being provided in said enlarged portion and said porting member being provided with ports providing communication between said cylindrical chamber and said outlet.
 (h) a pair of end caps each respectively removably secured to the ends of said housing,
 (i) said filter assembly including means engaging said end caps to prevent fluid leakage therepast,
 (j) said filter assembly being axially slidably removable from said housing upon removal of one of said end caps,
 (k) a rod member carried by one of said end caps in a position substantially coaxial with respect to said housing,
 (l) one of said end caps being provided with an axially inwardly extending hollow boss portion communicating with the interior of said porting member and ports providing communication between said inlet and the interior of said hollow boss portion,
 (m) a valve member axially slidably carried by said rod member in a position to seat in the open end of said hollow boss portion, and
 (n) by-passing means urging said valve member toward a position closing communication between said inlet and said porting member.

2. The device as defined in claim 1 and including a plurality of magnet members carried on said rod member within said cylindrical inner chamber.

3. The device as defined in claim 1 and including indicator means operably connected to said valve member to visibly indicate exteriorly of said housing the axial position of said valve member.

4. The filter device as defined in claim 1 and in which said filter assembly includes a second filter element having one end secured to said porting member and being axially spaced from said other filter element by said porting member.

5. A filter device comprising
 (a) a housing defining a closed cavity and having an inlet and an outlet communicating with said cavity,
 (b) a filter assembly including a substantially cylindrical filter element carried in said cavity,
 (c) said filter element being radially inwardly spaced from the inner wall of said housing and being substantially coaxial therewith to form a substantially annular outer chamber exteriorly of said filter element and a generally cylindrical chamber interiorly of said filter element,
 (d) said housing having a radially inwardly enlarged portion intermediate the ends of said housing,
 (e) said filter assembly further comprising a hollow porting member axially slidably engaging the surface of said enlarged portion and being secured to one end of said filter element in substantially axial alignment therewith,
 (f) said enlarged portion being provided with said inlet, a baffle member adjacent said inlet and a passage adjacent said baffle member providing communication with said annular chamber, and
 (g) said outlet being provided in said enlarged portion and said porting member being provided with ports providing communication between said cylindrical chamber and said outlet,
 (h) said housing comprising a pair of end caps each respectively removably secured to the ends of said housing,
 (i) said filter assembly including means engaging one of said end caps to prevent fluid leakage therepast,
 (j) said filter assembly being axially slidably removable from said housing upon removal of one of said end caps,
 (k) said filter assembly including a second filter element having one end secured to said porting member and being axially spaced from said other filter element by said porting member.

6. A filter device comprising
 (a) a housing defining a closed cavity and having an inlet and an outlet communicating with said cavity,
 (b) a filter assembly including a substantially cylindrical filter element carried in said cavity,
 (c) said filter element being radially inwardly spaced from the inner wall of said housing and being substantially coaxial therewith to form a substantially annular outer chamber exteriorly of said filter element and a generally cylindrical chamber interiorly of said filter element,
 (d) an inlet and an outlet provided on opposite sides of said housing and opening radially inwardly to the interior of said housing,
 (e) said filter assembly further comprising a hollow porting member axially slidably engaging the surface of the interior of said housing in an axial position adjacent said inlet and said outlet, and having one end secured to one end of said filter element in substantially axial alignment therewith, (f) a baffle member formed in said housing adjacent said inlet and a passage adjacent said baffle member providing communication with said annular chamber, (g) said porting member being provided with ports providing communication between said cylindrical chamber and said outlet and being separated from said inlet by said baffle member, (h) a pair of end caps each respectively removably secured to the ends of said housing, (i) said filter assembly including means engaging said end cap to prevent fluid leakage therepast, (j) indicator mechanism carried in one of said end caps and engaging with a valve member carried at one end of said filter element and said indicator means being operably connected to said valve member to visibly indicate exteriorly of said end cap the axial position of said valve member, (k) said filter assembly being axially slidably removable from said housing upon removal of the other of said end caps, 7. The filter device as defined in claim 6 and including
(a) a rod member carried by said end caps in a position substantially coaxial with respect to said housing, and
(b) a plurality of magnet members carried on said rod member within said cylindrical inner chamber.

8. A filter device comprising,
(a) a housing defining a closed cavity and having an inlet and an outlet communicating with said cavity,
(b) means including a filter element carried in said cavity separating said cavity into a first and a second chamber,
(c) said separating means including a porting member secured to said filter element and providing communication between said second chamber and said outlet,
(d) said housing being formed to provide a baffle means adjacent said inlet to be impinged upon by fluid entering said inlet and a passage adjacent said baffle means to conduct fluid from said inlet to said first chamber,
(e) a pair of end caps each respectively removably secured to one of the ends of said housing,
(f) a rod member carried by said end caps in a position substantially coaxial with respect to said housing,
(g) one of said end caps being provided with an axially inwardly extending hollow boss portion communicating with the interior of said porting member and ports providing communication between said inlet and the interior of said hollow boss portion,
(h) a valve member axially slidably carried by said rod member in a position to seat in the open end of said hollow boss portion,
(i) by-passing means urging said valve member toward a position closing communication between said inlet and said porting member.

9. A filter device comprising
(a) a housing defining a closed cavity and having an inlet and an outlet communicating with said cavity,
(b) a filter assembly including a substantially cylindrical element carried in said cavity,
(c) said filter element being radially inwardly spaced from the inner wall of said housing and being substantially coaxial therewith to form a substantially annular outer chamber exteriorly of said filter element and a generally cylindrical chamber interiorly of said filter element,
(d) said housing having a radially inwardly enlarged portion intermediate the ends of said housing,
(e) said filter assembly further comprising a hollow porting member axially slidably engaging the surface of said enlarged portion and being secured to one end of said filter element in substantially axial alignment therewith, (f) said enlarged portion being provided with said inlet, a baffle member adjacent said inlet and a passage adjacent said baffle member providing communication with said annular chamber, (g) said outlet being provided in said enlarged portion and said porting member being provided with ports providing communication between said cylindrical chamber and said outlet, (h) a rod member carried by said end caps in a position substantially coaxial with respect to said housing, (i) one of said end caps being provided with an axially inwardly extending hollow boss portion communicating with the interior of said porting member and ports providing communication between said inlet and the interior of said hollow boss portion, (j) a valve member axially slidably carried by said rod member in a position to seat in the open end of said hollow boss portion, and (k) biasing means urging said valve member toward a position closing communication between said inlet and said porting member.

10. A filter device comprising
(a) a housing defining a closed cavity and having an inlet and an outlet communicating with said cavity,
(b) means including a filter element carried in said cavity and separating said cavity into a first and a second chamber,
(c) said separating means including a porting member secured to said filter element and providing communication between said second chamber and said outlet,
(d) said housing being formed by a baffle means positioned adjacent said inlet to be impinged upon by fluid entering said inlet and a passage adjacent said baffle means to conduct fluid from said inlet to said first chamber, said housing having an interior surface and said porting member axially slidably engaging said surface,
(e) said porting member being hollow and means communicating the interior of said porting member with the interior of said filter element, means forming an annular passage about the exterior surface of said porting member, said passage registering with said outlet and being sealed from communication with said inlet by said baffle means, and a plurality of annularly spaced ports communicating the interior of said porting member with said passage.

11. A filter device comprising
(a) a housing defining a closed cavity and having an inlet and an outlet communicating with said cavity,
(b) a filter assembly including a substantially cylindrical filter element carried in said cavity,
(c) said filter element being radially inwardly spaced from the inner wall of said housing and being substantially coaxial therewith to form a substantially annular outer chamber exteriorly of said filter element and a generally cylindrical chamber interiorly of said filter element,
(d) said housing having a radially inwardly enlarged portion intermediate the ends of said housing,
(e) said filter assembly further comprising a hollow porting member axially slidably engaging the surface of said enlarged portion and being secured to one end of said filter element in substantially axial alignment therewith,
(f) said enlarged portion being provided with said inlet, a baffle member adjacent said inlet and a passage adjacent said baffle member providing communication with said annular chamber,
(g) said outlet being provided with said enlarged portion and said porting member further comprising means communicating the interior of said porting member with the interior of said filter element, means forming an annular passage about the exterior surface of said porting member, said passage registering with said outlet and being sealed from communication with said inlet by said baffle member, and a plurality of annularly spaced ports communicating the interior of said porting member with said passage.

References Cited by the Examiner

UNITED STATES PATENTS

| | | | |
|---|---|---|---|
| 2,076,936 | 4/1937 | Burekhater | 210—323 |
| 2,122,119 | 6/1938 | Thibert | 210—323 X |
| 2,431,782 | 12/1947 | Walton et al. | 210—440 X |
| 2,605,904 | 8/1952 | Ogilvie | 210—318 X |
| 2,638,228 | 5/1953 | Downey et al. | 210—133 X |
| 3,070,232 | 12/1962 | Casaleggi | 210—130 X |
| 3,080,058 | 3/1963 | Rosaen | 210—90 |
| 3,186,549 | 6/1965 | Botstiber | 210—130 X |

REUBEN FRIEDMAN, *Primary Examiner.*

SAMIH N. ZAHARNA, *Examiner.*